Patented Oct. 6, 1953

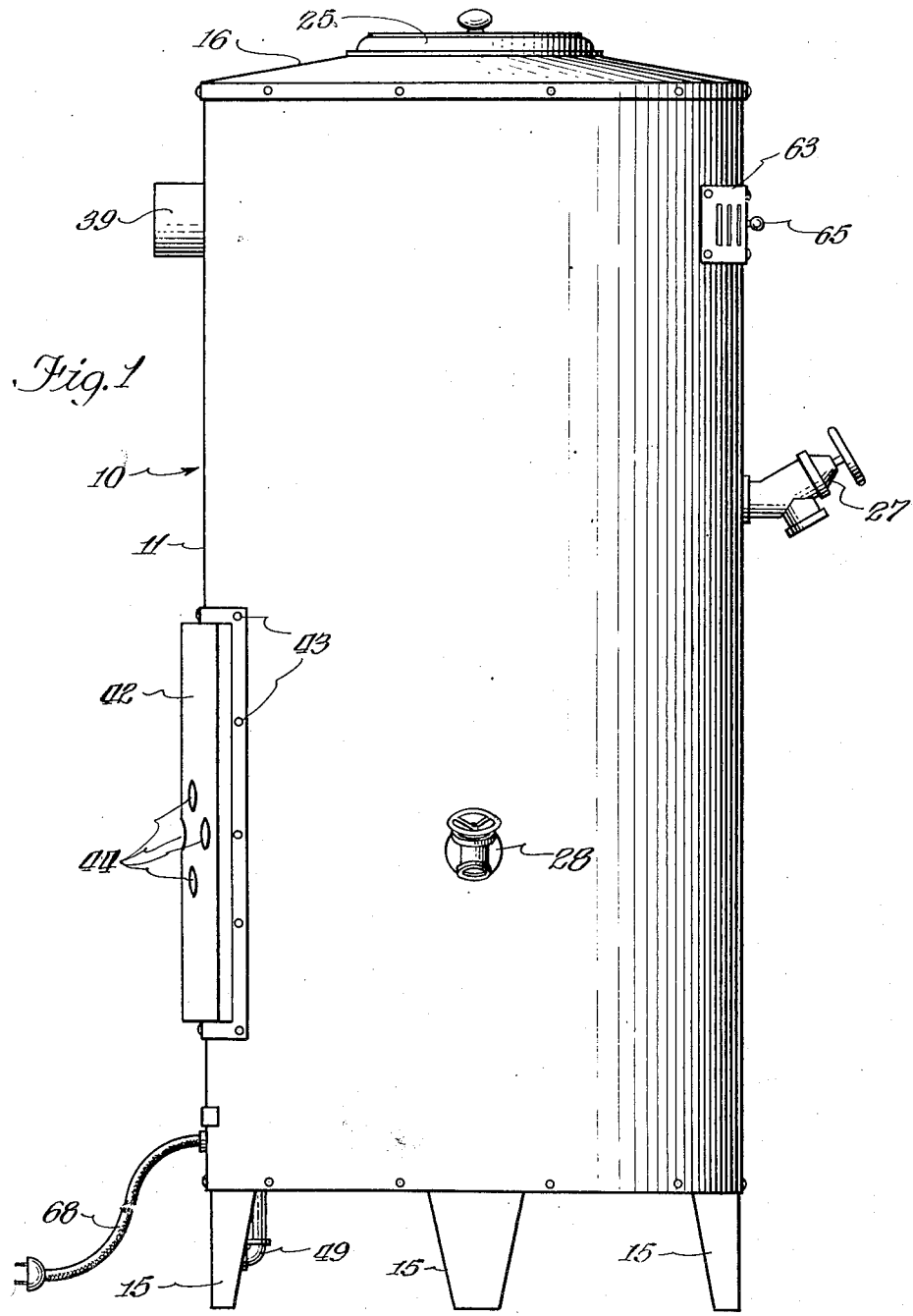

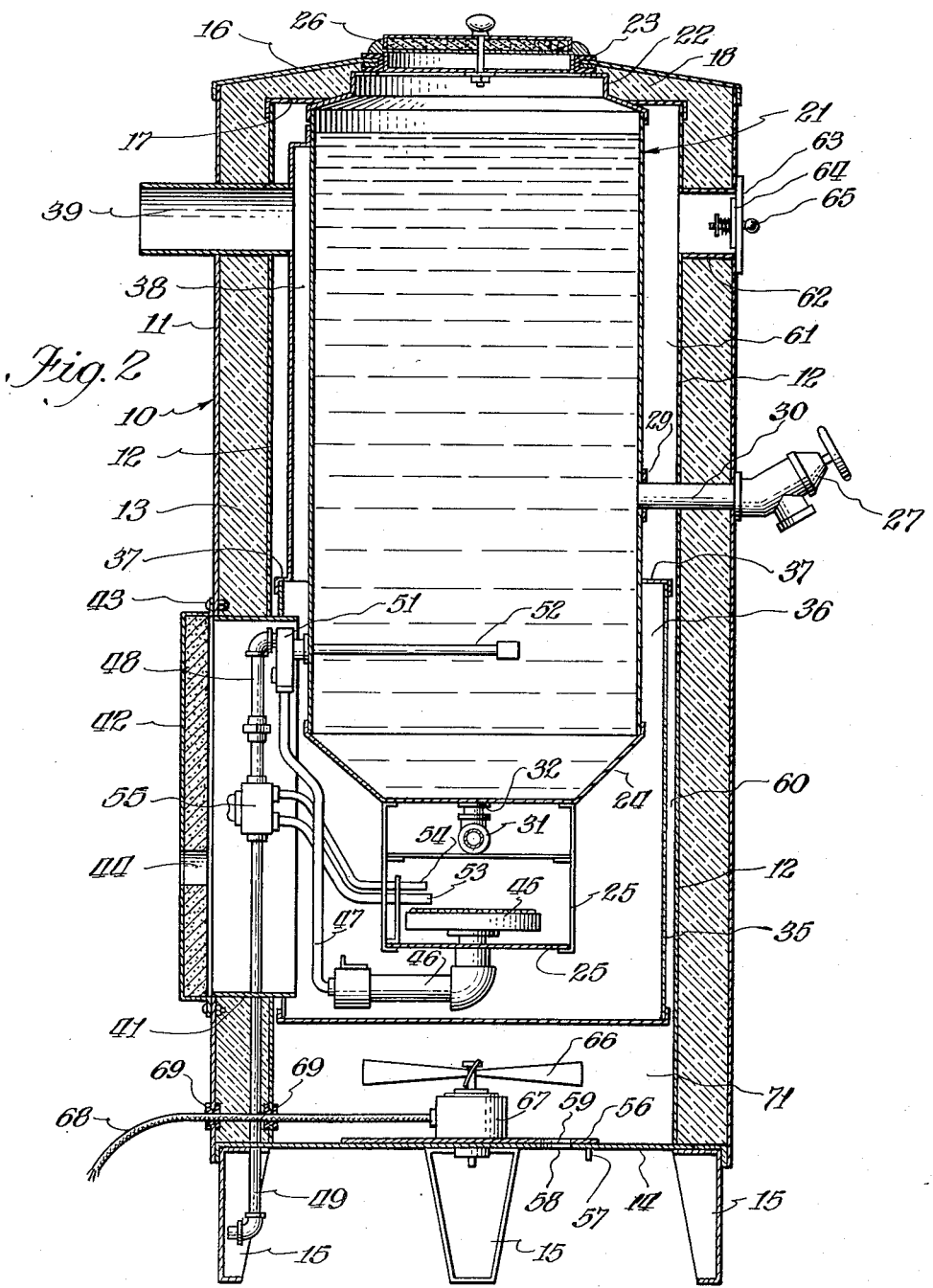

2,654,361

UNITED STATES PATENT OFFICE 2,654,361

COMBINATION WATER AND SPACE COMBUSTION HEATER

Bernard H. Losching, Janesville, Wis., assignor to The Schlueter Co., Janesville, Wis., a corporation of Wisconsin Application September 6, 1949, Serial No. 114,115

5 Claims. (Cl. 126—101)

This invention relates to heating devices and has for one of its objects the provision of a combustion heater adapted to selectively function as a water heating unit, a space heater, or both. The production of such a unit may have been attempted heretofore, but so far as known, no prior art devices have accomplished the desired results in a manner sufficiently satisfactory as to render the devices acceptable from a manufacturing standpoint.

It is believed that one of the primary reasons for this is that in order to attain the greatest possible efficiency, under various operating conditions, it is essential that the unit have high efficiency of heat transfer between the heating flame, the water and the air. This may be termed efficiency in three-way heat transfer, since to obtain the desired results, it is not only essential that the heat of the flame be transmitted efficiently to the water when used as a water heater and to the ambient air when used as a space heater, but it is also essential that the arrangement be such that the heat accumulated in the water may be efficiently transferred to the air, so that the water acts as a holding medium for the unit when functioning as a space heater, and the same water is also available to supply the tap demand.

These functions are accomplished according to the present teaching by a unique arrangement of the inter-related parts of the water tank combustion chamber and insulating housing of the unit, which in the present showing are all so arranged that the housing encloses both the water tank and combustion chamber, with surfaces of both the combustion chamber and the water tank positioned in spaced relation to the inner walls of the housing so as to define primary and secondary air passages wherein the air flowing through the device passes successively over the surfaces of the combustion chamber and then is drawn at a reduced speed over the external surfaces of the water tank. By this arrangement, efficient heat transfer from the combustion chamber directly to the air flowing through the passage may be accomplished when desired, yet when a substantial body of water of the inlet tank has been raised to a high temperature, this heat may also be transferred to the air if desired. The unit is provided, however, with shutters to control the flow of air, so that when the unit is used solely as a water heater the air flow may be completely cut off and the air then trapped in the space between the outside housing, and the water tank will then function as a dead air space to increase the efficiency of the thermal insulation of the tank.

A preferred commercial embodiment of the invention is illustrated in the drawings of this specification, wherein:

Figure 1 is a side elevational view of a combination water and space heater; and Figure 2 is a central sectional view thereof.

In the form of the invention chosen for purposes of illustration, the unit has an exterior housing generally designated as 10, which is, however, made up of an outside metallic shell 11 and an inside metallic wall 12, with the space between these walls packed with thermal insulating material 13. A material such as "fiber-glass" is ideal for the purpose. The housing includes a bottom panel 14 on which a plurality of legs 15 are secured to support the unit, and the upper end of the housing is finished by an outside top plate 16 and an inner top plate 17 spaced apart from each other and packed with thermal insulation 18. The water tank of the device, generally indicated by the numeral 21, includes a top portion 22 permanently joined to the upper end of the tank cylinder and bolted to the mouth flange 23 carried on the top plate 16 of the housing. Thus, the tank 21, including the bottom plate 24 and burner supporting brackets 25, may be suspended within the housing and spaced sufficiently from the inner walls 12 of the housing to provide a substantially annular air passage around the unit. The tank 21 is closed at its upper end by the insulated cover 26, and is preferably provided with upper and lower drain cocks 27 and 28 through which the heated water may be delivered. As shown, the drain cock 27 is positioned on the vertical wall of the tank 21 at a point partially up its side, and is connected to the tank through a nipple 30 threaded into the tank flange 29. The lower drain cock 28 communicates with the tank through a right-angled elbow fitting 31 threaded into the bottom pipe flange 32 of the tank.

The combustion chamber of the unit comprises a cylindrical sheet metal shell 35 concentric with the side walls of the tank 21, but of slightly greater diameter, so that the shell encloses the entire bottom of the tank, including the burner and brackets mounted thereon, and extends upwardly along the side walls to overlap the lower ends of the tank walls and provide an annular space 36 around the lower part of the tank walls, to accomplish maximum efficiency of heat transfer between the combustion chamber and the tank. The upper end of the combustion chamber is closed by a top plate 37, but an upwardly extending duct 38 is provided on one side of the tank to communicate with the flue 39 extending through the housing of the unit at a point near its top. The combustion chamber 35 of the unit includes a metallic control box 41 extending through the side walls of the housing and covered by a cover plate 42, which may be bolted in place by machine screws 43, but which is preferably provided with a number of vent openings 44 to admit air to the combustion chamber. The unit is heated by a gas burner 45 mounted on the burner bracket 25 and supplied with combustible gas through a mixer pipe 46 and gas lines 47, 48 and 49. These lines feed the gas to the burner through a regulator valve 51 controlled by a thermostat 52 in the interior of the water tank 21 and, as shown, the unit includes a pilot light 53, safety shut-off 54 and automatic valve 55, but since these may be of conventional design and construction, they will not be described in greater detail in the present disclosure.

It has been mentioned, however, that it is one of the objects of the present teaching to provide a unit which may be selectively employed as a water heater or a space heater. To this end, the housing is provided with a bottom air shutter in the form of a perforated plate 56 having a projecting tab 57, which may be manually shifted to bring the shutter apertures 58 and 59 into registry or move them into overlapping (closed) position. This shutter, therefore, provides an air intake to the lower end of the housing, from which the air may flow upwardly through the narrow annular primary air passage 60 between the outer wall 35 of the combustion chamber and the inner wall 12 of the housing into a wider secondary air passage 61 around the upper portion of the tank 21. An air outlet box 62 extends through the housing wall near the top of the housing, and the outer end of this box is covered by a perforated grille 63 having a manually shiftable shutter plate 64. Registering openings are provided in the grille and shutter so that it may be opened or closed by manual manipulation of the handle 65.

From the foregoing it will be seen that with the shutters 56 and 64 open, there is an air passage which may be traced through the openings 58—59, then upwardly through the primary air passage 60 and secondary air passage 61 to the air outlet box 62, and thence through the shutter 64 and hot air grille 63. When the unit is heated, flow of air through this path will take place by convection, but the flow may be further augmented by the provision of a fan or blower 66 driven by an electric motor 67, which may be supplied with power through a flexible cord 68 passing from the housing of the unit through insulating grommets 69.

When the unit is to be operated as a water heater only, the shutters 56 and 64 are closed. Thus, when the flame is ignited at the burner 45, the air space 71 at the bottom of the housing, together with the primary air passage 60 around the combustion chamber and the secondary air passage 61 around the upper end of the water tank all combine to form a dead air space around the water tank and combustion chamber. This acts as an effective thermal insulating layer which, acting with the insulation 13 of the housing wall, prevents any substantial transfer of heat from the water and flame to the air outside of the unit and thus aids in effecting transfer of heat through the bottom and side walls of the water tank to the water itself. As the water is heated, the normal processes of convection cause an upward flow along the tank walls and a downward flow of relatively cool water in the central portion of the tank, so that the heated water rises upwardly from the annular rim 36 of the combustion chamber and is quickly available at the location of the pipe flange 29, from which it may be drawn through the drain cock 27.

When the unit is to function as a space heater, the shutters 56 and 64 are opened and if desired, the motor 67 may be energized to drive the fan 66. Under these conditions the air entering the bottom of the housing first flows upwardly through the relatively narrow air passage 60 between the outer shell 35 of the combustion chamber and the inner metallic wall 12 of the insulated housing. The air is quickly heated as it moves through this space, since it is not only exposed to the heated surface of the combustion chamber shell 35, but is also exposed to the surface of the inner metal wall 12 which is, of course, itself heated by radiation from the shell of the combustion chamber. The air passing through the passage 60 is thus heated directly from the combustion chamber in the primary air passage, but as has been heretofore pointed out, the employment of the large tank of heated water provides a means for accumulating heat so that after the water itself has been brought to a high temperature, additional heat is transferred from the water to the air as the air passes through the secondary chamber 61. Ordinarily the temperature differential between the air and water is somewhat less than the differential existing between the air and metal at the primary air passage 60, but since the passage 61 is somewhat wider than the passage 60, the flow of air therethrough is not so rapid; and it may be demonstrated that a substantial heat transfer takes place through the upper walls of the tank 21 to warm the air from the heat of the water, as well as from the direct heat of the combustion chamber. Obviously this heat transfer continues even after the gas to the burner 45 is turned off, and it follows that the heat accumulated in the water of the unit may be quickly transferred to the ambient air, irrespective of whether the operation of the burner is continued.

From the foregoing it will be seen that the device of this disclosure accomplishes the functions of both a water heater and space heater, and achieves a high degree of efficiency in each function by the novel arrangement of parts permitting maximum efficiency in three-way heat transfer. Thus, the heat generated by the flame in the combustion chamber may be transferred directly to the air, directly to the water, or may be accumulated in the water and thereafter transferred to the air, so that the water acts as a holding medium for the space heating function, yet is also available to supply the tap requirements. When functioning as a water heater solely, the air passages coact with the thermal insulating of the housing to provide an unusually efficient insulating assembly capable of retaining the water at high temperature for an unusually long period of time. The unit may be used either in pressure systems or for non-pressure operation, and the hot water and hot air outlets are located adjacent each other so that when the device is used in a milk house with standard wash tanks, the farm air from the grille 63 is directed toward the person using the tanks, so that he attains a sensible heat higher than the surrounding air.

The form of the invention shown is the commercial form of the device presently manufactured, and is believed to be well suited to a description of the inventive principles thereof, but it is recognized that it is subject to various modifications and that many and varied changes in design and structure may be made without departing from the concepts of the invention. It is accordingly pointed out that the scope of the inventive thought is not limited to the precise details of the structure shown, but it extends with equal force to any variations and modifications thereof within the terms of the appended claims.

Having thus described my invention, what I claim as new and desire to secure by United States Letters Patent is:

1. A combination water and space heater comprising a vertical cylindrical water tank and a concentric cylindrical combustion housing closed at its lower end, said combustion housing being of larger diameter than the water tank, extending beneath the water tank to form therewith a combustion chamber and extending upwardly partially of the height of the tank and is spaced relation to the side walls of said tank, a burner in said combustion chamber, a combustion air inlet in communication with said combustion chamber, and a flue communicating with the upper end of said combustion housing; and an exterior cylindrical housing of substantially uniform diameter throughout its height and of diameter greater than the combustion housing and concentrically enclosing the combustion housing, flue and water tank; said exterior housing having outer and inner metallic walls spaced from each other by a thermal insulating layer, the inner wall of said exterior housing being close to the wall of the combustion housing to provide a narrow substantially annular air passage between the combustion housing and the exterior housing and a wider chamber air passage between the tank and the exterior housing, said exterior housing including an inlet and outlet communicating respectively with said air passages together with control shutters operatively associated with said air passages whereby said shutters may be opened to permit the flow of heated air through the passages between the combustion housing, tank and exterior housing to the outlet thereof; or closed to provide a dead air insulating layer around the combustion housing and tank.

2. A combination water and space heater comprising a vertical cylindrical water tank and a concentric cylindrical combustion housing closed at its lower end, said combustion housing being of larger diameter than the water tank, extending beneath the water tank to form therewith a combustion chamber and extending upwardly partially of the height of the tank and in spaced relation to the side walls of said tank, a burner in said combustion chamber, a combustion air inlet in communication with said combustion chamber, and a flue communicating with the upper end of said combustion housing; and an exterior cylindrical housing of substantially uniform diameter throughout its height and of diameter greater than the combustion housing and concentrically enclosing the combustion housing, flue and water tank; said exterior housing having outer and inner metallic walls spaced from each other by a thermal insulating layer, the inner wall of said exterior housing being close to the wall of the combustion housing to provide a narrow substantially annular air passage between the combustion housing and the exterior housing and a wider chamber air passage between the tank and the exterior housing, said exterior housing including an inlet and outlet communicating respectively with said air passages.

3. A combination water and space heater comprising a vertical cylindrical water tank and a concentric cylindrical combustion housing closed at its lower end, said combustion housing being of larger diameter than the water tank, extending beneath the water tank to form therewith a combustion chamber and extending upwardly partially of the height of the tank and in spaced relation to the side walls of said tank, a burner in said combustion chamber, a combustion air inlet in communication with said combustion chamber, and a flue communicating with the upper end of said combustion housing; and an exterior cylindrical housing of substantially uniform diameter throughout its height and of diameter greater than the combustion housing and concentrically enclosing the combustion housing, flue and water tank; said exterior housing having outer and inner metallic walls spaced from each other by a thermal insulating layer, the inner wall of said exterior housing being close to the wall of the combustion housing to provide a narrow substantially annular air passage between the combustion housing and the exterior housing and a wider chamber air passage between the tank and the exterior housing, said exterior housing including an inlet and outlet communicating respectively with said air passages, and additional means to regulate the flow of ambient air through said passage.

4. A combination water and space heater comprising a vertical cylindrical water tank and a combustion housing closed at its lower end, said combustion housing being of larger diameter than the water tank, extending beneath the water tank to form therewith a combustion chamber and extending upwardly partially of the height of the tank and in spaced relation to the side walls of said tank, a burner in said combustion chamber, a combustion air inlet in communication with said combustion chamber, and a flue communicating with the upper end of said combustion housing; an exterior cylindrical housing of diameter greater than the said combustion housing and concentrically enclosing the combustion housing, flue and water tank, said exterior housing having vertical inner walls close to the walls of the combustion housing and more widely spaced away from the walls of the water tank to provide a narrow air passage along the combustion housing and a wider air passage along the sides of the water tank above the combustion housing; and control shutters operatively associated with said air passages whereby said shutters may be opened to permit the flow of heated air through said passages, or closed to provide a dead air insulating layer around the combustion housing and tank, said exterior housing including an inlet and outlet communicating respectively with said air passages.

5. A combination water and space heater comprising a vertical cylindrical water tank and a combustion housing closed at its lower end, said combustion housing being of larger diameter than the water tank, extending beneath the water tank to form therewith a combustion chamber and extending upwardly partially of the height of the tank and in spaced relation to the side walls of said tank, a burner in said combustion chamber, a combustion air inlet in communication with said combustion chamber, and a flue communicating with the upper end of said combustion housing; an exterior cylindrical housing of diameter greater than the said combustion housing and concentrically enclosing the combustion housing, flue and water tank, said exterior housing having vertical inner walls close to the walls of the combustion housing and more widely spaced away from the walls of the water tank to provide a narrow air passage along the combustion housing and a wider air passage along the sides of the water tank above the combustion housing, said exterior housing including an inlet and outlet communicating respectively with said air passages.

BERNARD H. LOSCHING.

References Cited in the file of this patent

UNITED STATES PATENTS

| Number | Name | Date |
|---|---|---|
| 1,140,239 | Barth | May 18, 1915 |
| 2,225,023 | Watt | Dec. 17, 1940 |
| 2,243,455 | Doherty | May 27, 1941 |
| 2,354,507 | Doherty | July 27, 1944 |
| 2,556,170 | Davidson | June 12, 1951 |